(12) United States Patent
Gamble et al.

(10) Patent No.: US 6,233,143 B1
(45) Date of Patent: May 15, 2001

(54) SHOCK DAMPENING SYSTEM FOR HARD DISK DRIVE CARRIER

(75) Inventors: Eric T. Gamble; Edward J. McNulty, both of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,453

(22) Filed: Sep. 22, 1999

(51) Int. Cl.[7] ........................................... H05K 5/00
(52) U.S. Cl. ..................... 361/685; 361/686; 360/97.01; 312/332.1
(58) Field of Search ..................... 361/685, 686, 361/724–727; 369/75.1, 82; 360/97.01, 98.01, 137, 137 D; 312/332.1, 333

(56) References Cited

U.S. PATENT DOCUMENTS

| | | | |
|---|---|---|---|
| 4,845,589 | 7/1989 | Weidler et al. | 361/727 |
| 5,315,478 | 5/1994 | Cadwell et al. | 361/684 |
| 5,332,306 | 7/1994 | Babb et al. | 312/223.1 |
| 5,340,340 | 8/1994 | Hastings et al. | 439/64 |
| 5,515,239 | 5/1996 | Kamerman et al. | 361/727 |
| 5,579,204 | 11/1996 | Nelson et al. | 361/685 |
| 5,652,695 | 7/1997 | Schmitt | 361/685 |
| 5,654,875 | 8/1997 | Lawson | 361/685 |
| 5,666,271 | 9/1997 | Kim et al. | 361/726 |
| 5,721,669 | 2/1998 | Becker et al. | 361/685 |
| 5,734,557 | 3/1998 | McAnally et al. | 361/685 |
| 5,914,855 | 6/1999 | Gustafson et al. | 361/685 |
| 5,978,212 | * 11/1999 | Boulay et al. | 361/685 |
| 6,011,687 | 1/2000 | Gluskoter et al. | 361/685 |
| 6,058,016 | 5/2000 | Anderson et al. | 361/727 |
| 6,067,225 | 5/2000 | Reznikov et al. | 361/685 |
| 6,088,221 | * 7/2000 | Bologna | 361/685 |

* cited by examiner

Primary Examiner—Leo P. Picard
Assistant Examiner—Hung Van Duong
(74) Attorney, Agent, or Firm—Felsman, Bradley, Vaden, Gunter & Dillon, LLP

(57) ABSTRACT

A carrier for a hot-pluggable hard disk drive has a frame with a pair of side walls, a front end, and a rear end. The hard disk drive mounts to the frame within its confines. A connector is provided for electrically coupling the hard disk drive to a computer system. A channel is formed in one side wall and a guide surface is formed on the other side wall of the frame. Each side wall has a recess at the front ends of the channel and guide surface. The recesses house shock dampening yokes. Each yoke is a C-shaped member with a hub and a pair of fingers. The carrier mounts in a computer system having a docking bay. Each side of the bay has a guide rib and a docking connector is mounted at the rear. As the carrier is inserted into the bay, the ribs simultaneously engage the channel and the guide surface in the side walls and are directed into the yokes. The yokes allow some compliant motion and deflect to a preload position against the ribs upon contact.

26 Claims, 3 Drawing Sheets

SHOCK DAMPENING SYSTEM FOR HARD DISK DRIVE CARRIER

BACKGROUND OF THE INVENTION

1. Technical Field

This invention relates in general to hard disk drives and in particular to a shock dampening system for a hot-pluggable hard disk drive carrier.

2. Background Art

"Hot-pluggable" hard disk drives are removable during operation in a computer or peripheral systems environment. A drive is typically mounted in a hard disk drive carrier prior to installation in a system. A drive carrier is typically a frame-like metallic structure that attaches to the drive to assist in its insertion into or removal from the system. Drive carriers also protect the drive when it is outside of the system environment. The system usually contains several drive and carrier assemblies, each of which may be readily interchangeable in the system. Each assembly is mounted in a docking bay in a metal chassis located within a system enclosure.

Occasionally, the system and its hard disk drives will be exposed to shock vibration. Shock can be inflicted through a number of sources including incidental contact with the system enclosure or relocating the system. If the system is mounted on a portable rack with coasters, it will be subjected to some level of shock as it rolled between destinations. Since both the drive carriers and system enclosure chassis are constructed from metallic parts, the shock is readily and forcefully transmitted to the sensitive electronic components of the drives. Thus, with the typical shock vibration of 150 g's or more with a two to three millisecond duration, the drive performance of the drives can be reduced and their components can be damaged from such events. An improved shock dampening system interface for drive carriers and the systems they are mounted in is needed.

SUMMARY OF THE INVENTION

A carrier for a hot-pluggable hard disk drive has a frame with a pair of side walls, a front end, and a rear end. The hard disk drive mounts to the frame within its confines. A connector is provided for electrically coupling the hard disk drive to a computer system. A channel is formed in one side wall and a guide surface is formed on the other side wall of the frame. Each side wall has a recess at the front ends of the channel and guide surface. The recesses house shock dampening yokes. Each yoke is a C-shaped member with a hub and a pair of fingers.

The carrier mounts in a computer system having a docking bay. Each side of the bay has a guide rib and a docking connector is mounted at the rear. As the carrier is inserted into the bay, the ribs simultaneously engage the channel and the guide surface in the side walls and are directed into the yokes. The yokes allow some compliant motion and deflect to a preload position against the ribs upon contact.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
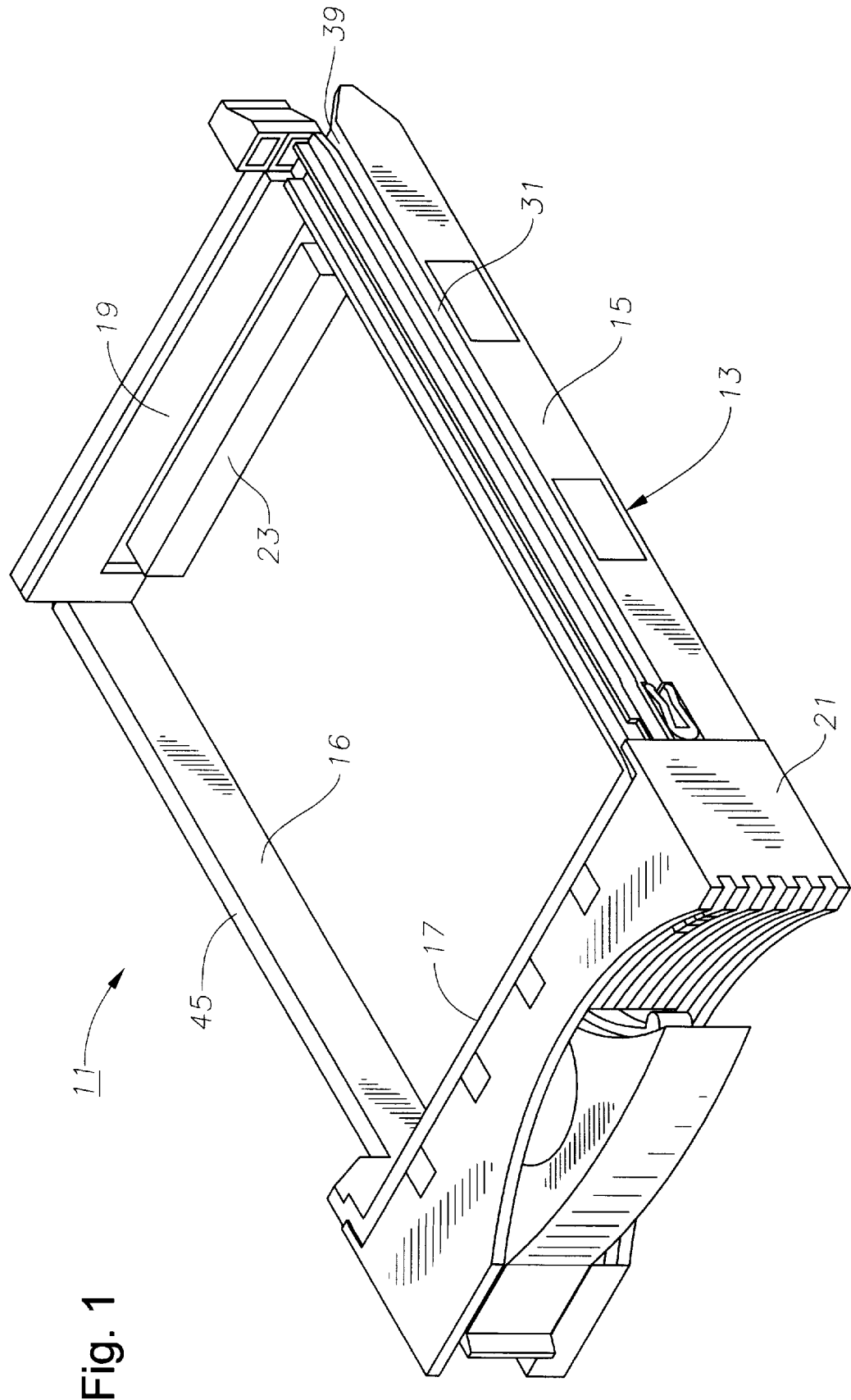
FIG. 1 is a front isometric view of a hard disk drive carrier assembly having shock-absorbing yokes constructed in accordance with the invention.
Figure 2:
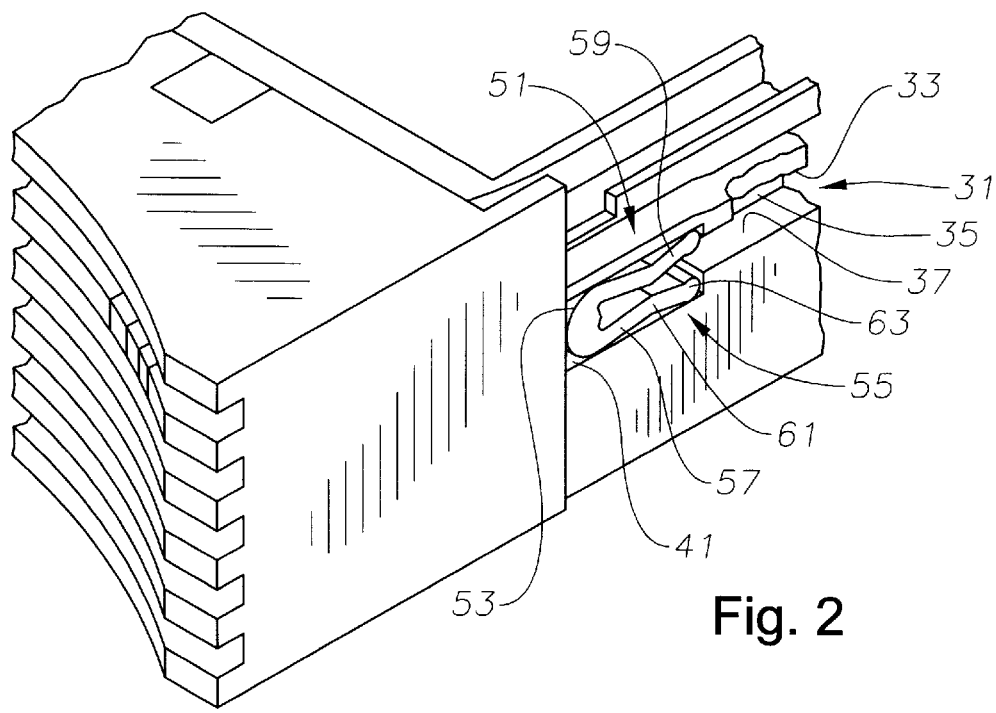
FIG. 2 is a side isometric view of the carrier assembly of FIG. 1.

Referring to FIGS. 1 and 2, a tray or carrier 11 for a hot-pluggable hard disk drive is shown. Carrier 11 has a rigid, generally rectangular frame 13 with a pair of side walls 15, 16, a front end 17, and a rear end 19. In one embodiment, frame 13 is zinc plaster cast and its side walls 15, 16 and ends 17, 19 are orthogonal relative to each other. The hard disk drive (not shown) mounts to frame 13 within its confines. A cosmetic bezel 21 is mounted to front end 17 of frame 13 and a connector 23 is mounted to the rear end 19 of frame 13. Connector 23 is provided for electrically coupling the hard disk drive to a computer system.

A rectangular groove or channel 31 is formed in the longitudinal outer surface of side wall 15 of frame 13. Channel 31 has three orthogonal support surfaces 33, 35, 37 and an open outer side. The rear end 39 of channel 31 (FIG. 1) is also open for receiving a support structure as will be described below. A rectangular recess 41 (FIG. 2) is formed on the front end of channel 31. Recess 41 is slightly wider than channel 31 but is formed at the same depth into side wall 15. Recess 41 has a hole 43 (see FIG. 3) at its front end that extends completely through side wall 15.

Figure 3:
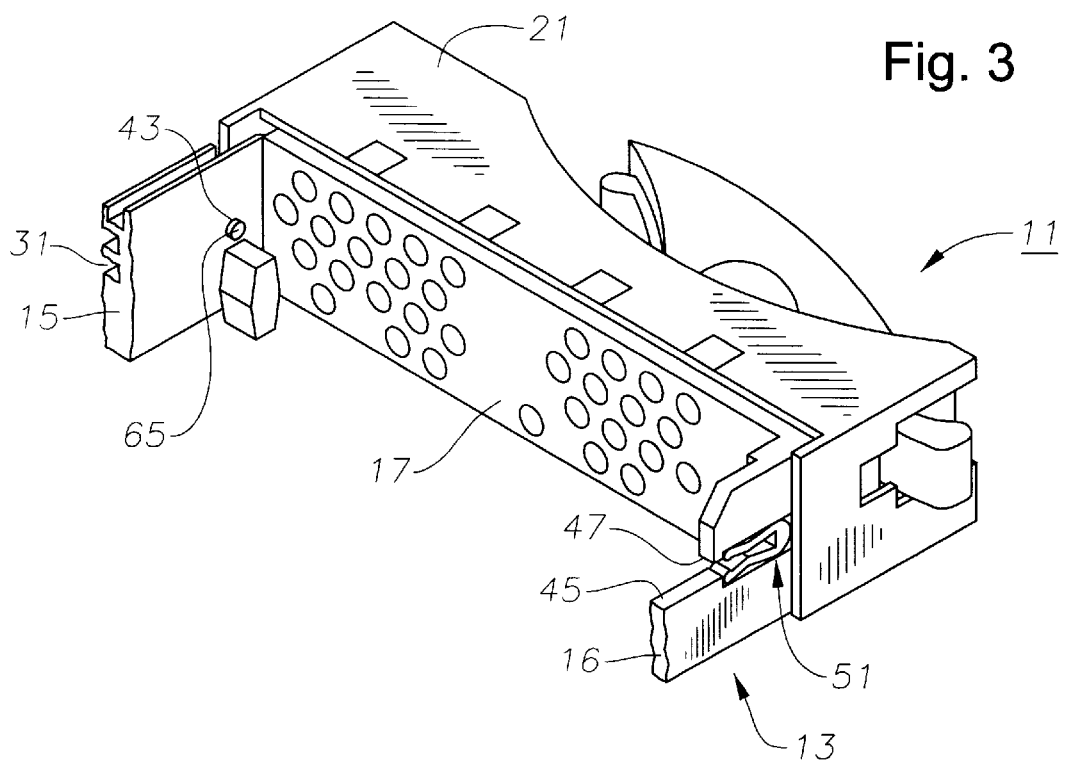
FIG. 3 is a rear isometric view of the carrier assembly of FIG. 1.

As shown in FIG. 3, side wall 16 of frame 13 is only about half as wide as side wall 15. Side wall 16 has an upper surface 45 that is parallel to and congruent with support surface 37 in channel 31 on the opposite side of carrier 11. Like side wall 15, side wall 16 has a rectangular recess 47 formed at the front end 17 of frame 13. Recess 47 has the same dimensions as recess 41 and includes a hole (not shown) that is identical to and congruent with hole 43.

Figure 4:
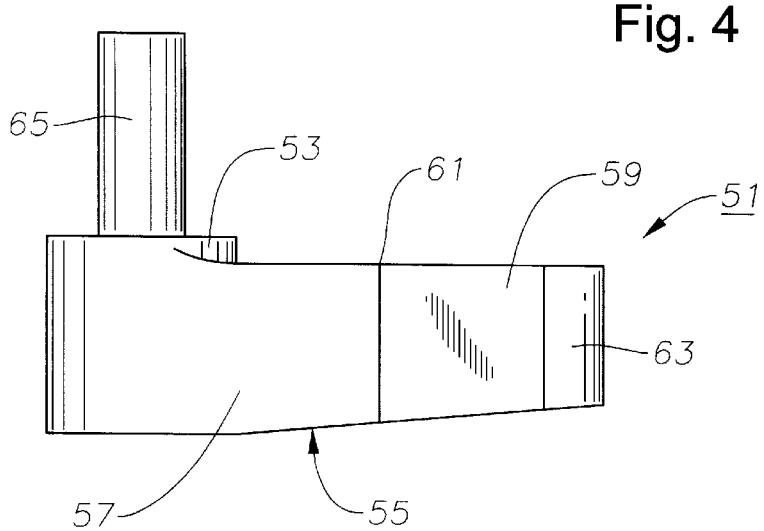
FIG. 4 is an enlarged top view of one of the yokes of FIG. 1.

Referring now to FIGS. 2–4, carrier 11 also has a small yoke 51 mounted in each of its recesses 41, 47. Yoke 51 is formed from a resilient plastic such as glass-reinforced nylon to avoid creep. Yoke 51 is a C-shaped member having a generally cylindrical hub 53 at its apex and a pair of fingers 55 extending rearward from hub 53. Each finger 55 has a proximal portion 57, a distal portion 59, and an interface 61 therebetween. Proximal portions 57 extend from hub 53 and are inclined toward each other at a slight acute angle. Distal portions 59 extend from interfaces 61 away from each other at approximately the same angle of inclination as portions 57, but in the opposite direction. Each finger 55 also has a circular knob 63 on the rearward end of its distal portion 59.

The narrowest distance of separation between fingers 55 is at interfaces 61. The fingers 55 are separated by larger distances between knobs 63 and at hub 53. As shown in FIG. 4, the outer or exposed surfaces of fingers 55 are tapered inward toward frame 13 beginning at hub 53. A cylindrical boss 65 extends concentrically from an inner surface of hub 53. Bosses 65 are inserted through and closely received by the holes 43 in recesses 41, 47. The inner ends of bosses 65 are deformed or melted slightly to retain yokes 51 on frame 13.

Figure 5:
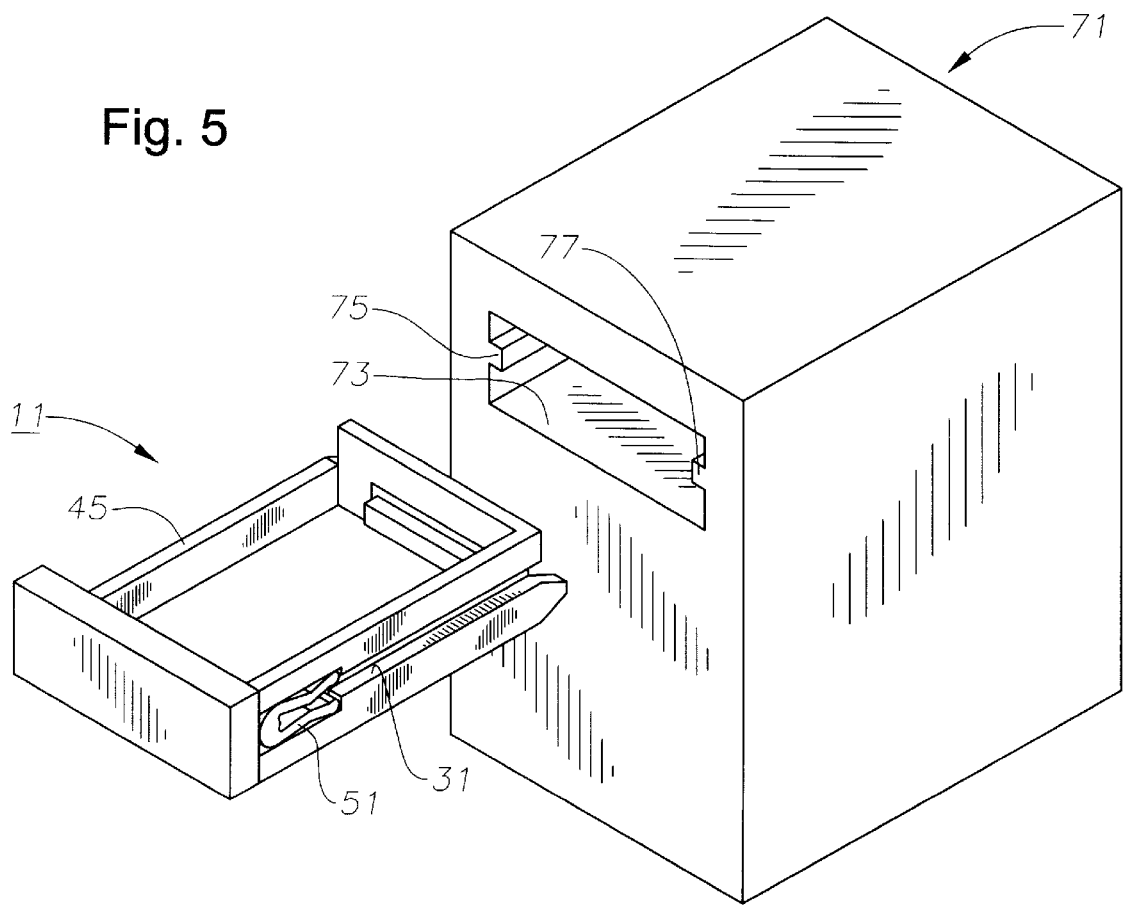
FIG. 5 is a schematic, front isometric view of the carrier assembly of FIG. 1 and a computer system.

In operation (FIG. 5), carrier 11 is designed to be mounted in and electrically interconnected to a computer system 71 having a rectangular docking bay 73. The lateral sides of bay 73 have longitudinal, generally rectangular guide rails or ribs 75, 77 that are substantially identical. As carrier 11 is inserted into bay 73, ribs 75, 77 simultaneously engage channel 31 and surface 45 on side wall 16, respectively, to precisely position carrier 11 in system 71. The tapers on the outer surfaces of yokes 51 prevent knobs 63 from catching on or getting hung up as carrier 11 is inserted.

The leading or front edge of rib 77 enters rear end 39 of channel 31, and the leading edge of rib 75 is located on top of surface 45. The three orthogonal support surfaces 33, 35, 37 closely receive rib 77 until its leading edge enters recess 41. Similarly, rib 75 rides along surface 45 until it enters recess 47. There, the throats between knobs 63 accept ribs 75, 77 and direct them into yokes 51. Yokes 51 have a very limited range of pivotal lash about bosses 65 to accommodate ribs 75, 77. The knobs 63 on the ends of fingers 55 have slight clearances in recesses 41, 47 to allow some compliant motion. When the leading edges of ribs 75, 77 engage interfaces 61, fingers 55 deflect away from one another to preload yokes 51 against ribs 75, 77. Interfaces 61 essentially pinch on the upper and lower surfaces of ribs 75, 77. The resilient reinforced material of yokes 51 allows them to maintain the preload and prevents creep. Carrier 11 is fully installed in bay 73 when the leading edges of ribs 75, 77 abut the inner surfaces of hubs 53 in yokes 51, and connector 19 interconnects with the system connector at the back of bay 73. Carrier 11 is removed from system 71 by pulling it out of bay 73 and overcoming the frictional forces between the contacting elements.

The invention has several advantages. Each yoke is a single-piece polymer that dampens shock to the hard disk drive in the carrier. Since the carrier only has three points of contact with the system (the two yokes and the rear connector), metal-to-metal contact is avoided to greatly reduce shock transmissions. The carrier and disk drive essentially "float" on the two yokes. When the system experiences a shock event, the drive experiences a damped input because of the floating and spring/damping effect of the yokes.

The deflection capability of the yokes dissipates the shock energy curve from what might typically be 150+ g's with a two to three millisecond duration, to less than 40 g's at a 10 millisecond duration. As required by hard disk drive manufacturer specifications, this improvement reduces the shock energy levels to the extremely low risk range for inducing shock-related damage to the hard disk drive. In addition, this solution is a low cost, self-centering design. The yokes remain permanently mounted to the carrier throughout its life instead of being throw-away packaging material, making it a better solution for portable equipment.

While the invention has been shown or described in only some of its forms, it should be apparent to those skilled in the art that it is not so limited, but is susceptible to various changes without departing from the scope of the invention.

We claim:

1. A carrier for a computer system hard disk drive, the computer system having an enclosure, a docking bay located within the enclosure for receiving the carrier, a docking connector in the rear of the docking bay, and a pair of longitudinal guide rails on the sides of the docking bay, the carrier comprising:
    a frame having a front end, a rear end, and first and second side walls extending therebetween, the frame being adapted to support a hot-pluggable hard disk drive;
    a connector mounted to the rear end of the frame and adapted to electrically interconnect the disk drive to the docking connector;
    a longitudinal slot on an outer surface of the first side wall and extending from the rear end of the frame forward, the slot having an opening adjacent to the rear end that is adapted to receive a leading edge of one of the guide rails in the docking bay;
    a longitudinal guide surface on the second side wall and extending from the rear end of the frame forward, the guide surface being parallel to the slot and adapted to engage a leading edge of the other of the guide rails in the docking bay; and
    a shock dampener mounted to each of the slot and guide surface, the shock dampeners being adapted to capture and isolate the leading edges of the guide rails from the frame such that the only points of contact between the carrier and the computer system are the shock dampeners and the connector.

2. The carrier of claim 1 wherein each of the shock dampeners has a hub and a pair of fingers extending rearward from the hub that define an opening and are adapted to receive the leading edges of the guide rails to seat them against the hubs.

3. The carrier of claim 1 wherein each of the shock dampeners has a pair of rearward extending fingers that diverge from each other in a rearward direction, each of the fingers having a forward portion that is adapted to grip one of the guide rails between them.

4. The carrier of claim 1 wherein each of the shock dampeners has a pair of rearward extending fingers, and the fingers have rearward ends with circular knobs for guiding the leading ends of the guide rails therein.

5. The carrier of claim 1 wherein the shock dampeners are pivotally mounted to the frame for movement about an axis perpendicular to the slot and guide surface to allow compliance between the guide rails and the carrier.

6. The carrier of claim 1 wherein each of the shock dampeners has a hub, a pair of fingers extending from the hub and diverging from each other in a rearward direction, and a pin extending from the hub into an aperture in the frame, wherein each pair of fingers defines an opening that is adapted to receive the leading edge of one of the guide rails to seat it against the hub.

7. The carrier of claim 1 wherein the slot is a rectangular channel having three support surfaces and the guide surface is an upper surface of the second side wall.

8. The carrier of claim 1 wherein the shock dampeners are located adjacent to the front end of the frame.

9. The carrier of claim 1 wherein the shock dampeners are formed from reinforced polymer.

10. The carrier of claim 1 wherein one of the shock dampeners is mounted in a first recess in the slot, and the other of the shock dampeners is mounted in a second recess in an outer surface of the second side wall adjacent to the guide surface.

11. A carrier for a computer system hard disk drive, the computer system having an enclosure, a docking bay located within the enclosure for receiving the carrier, a docking connector in the rear of the docking bay, and a pair of longitudinal guide rails on the sides of the docking bay, the carrier comprising:

a frame having a front end, a rear end, and first and second side walls extending therebetween, the frame being adapted to support a hot-pluggable hard disk drive;

a connector mounted to the rear end of the frame and adapted to electrically interconnect the disk drive to the docking connector;

a longitudinal slot on an outer surface of the first side wall and extending from the rear end of the frame forward, the slot having an opening adjacent to the rear end that is adapted to receive a leading edge of one of the guide rails in the docking bay;

a longitudinal guide surface on the second side wall and extending from the rear end of the frame forward, the guide surface being parallel to the slot and adapted to engage a leading edge of the other of the guide rails in the docking bay;

a first recess in the slot;

a second recess in an outer surface of the second side wall adjacent to the guide surface; and a shock dampener mounted in each of the first and second recesses adjacent to the front end of the frame, each of the shock dampeners having a hub and a pair of fingers extending rearward from the hub and diverging from each other to define an opening at their rearward ends that is adapted to receive one of the leading edges of the guide rails to seat it against the hub, and wherein the shock dampeners have forward portions that are adapted to grip the guide rails.

12. The carrier of claim 11 wherein the rearward ends of the fingers on the shock dampeners have circular knobs for guiding the leading ends of the guide rails into the openings.

13. The carrier of claim 11 wherein the shock dampeners are pivotally mounted to the frame for movement about an axis perpendicular to the slot and guide surface to allow compliance between the guide rails and the carrier.

14. The carrier of claim 11 wherein each of the shock dampeners has a pin extending from the hub into an aperture in the frame.

15. The carrier of claim 11 wherein the slot is a rectangular channel having three support surfaces and the guide surface is an upper surface of the second side wall.

16. The carrier of claim 11 wherein the shock dampeners are formed from reinforced polymer to prevent creep.

17. The carrier of claim 11 wherein the shock dampeners are adapted to capture and isolate the leading edges of the guide rails from the frame such that the only points of contact between the carrier and the computer system are the shock dampeners and the connector.

18. A computer system, comprising in combination:

a hot-pluggable hard disk drive;

a carrier for carrying the hard disk drive;

a system enclosure having a generally rectangular docking bay for receiving the carrier and hard disk drive, a docking connector at a rear end of the docking bay, and a pair of longitudinal, parallel guide rails on lateral sides of the docking bay; wherein the carrier comprises:

a frame having a front end, a rear end, and first and second side walls for supporting the hard disk drive;

a connector mounted to the rear end of the frame for electrically interconnecting the hard disk drive to the docking connector;

a longitudinal slot on an outer surface of the first side wall and extending from the rear end of the frame forward, the slot having an opening adjacent to the rear end for receiving a leading edge of one of the guide rails in the docking bay;

a longitudinal guide surface on the second side wall and extending from the rear end of the frame forward, the guide surface being parallel to the slot for engaging a leading edge of the other of the guide rails in the docking bay; and a shock dampener mounted to each of the slot and guide surface adjacent to the front end of the frame for capturing and isolating the leading edges of the guide rails from the frame such that the only points of contact between the carrier and the computer system are the shock dampeners and the connector.

19. The computer system of claim 18 wherein each of the shock dampeners has a hub and a pair of fingers extending rearward from the hub that define an opening for receiving the leading edges of the guide rails to seat them against the hubs.

20. The computer system of claim 18 wherein the shock dampeners are pivotally mounted to the frame for movement about an axis perpendicular to the side walls for compliance between the guide rails and the carrier.

21. The computer system of claim 18 wherein the slot is a rectangular channel having three support surfaces and the guide surface is an upper surface of the second side wall.

22. The computer system of claim 18 wherein the shock dampeners are formed from reinforced polymer to prevent creep.

23. The computer system of claim 18 wherein one of the shock dampeners is mounted in a first recess in the slot, and the other of the shock dampeners is mounted in a second recess in an outer surface of the second side wall adjacent to the guide surface.

24. The computer system of claim 19 wherein the fingers on each shock dampener diverge from each other and have forward portions that grip the guide rails.

25. The computer system of claim 19 wherein the openings are defined by circular knobs that guide the leading ends of the guide rails.

26. The computer system of claim 19 wherein each shock dampener has a pin extending into an aperture in the frame.

* * * * *